United States Patent [19]

Anderson et al.

[11] Patent Number: 4,487,856
[45] Date of Patent: Dec. 11, 1984

[54] ETHYLENE POLYMER COMPOSITE HEAT STORAGE MATERIAL

[75] Inventors: Albert G. Anderson, Wilmington; Edward G. Howard, Jr., Hockessin, both of Del.

[73] Assignee: E. I. Du Pont de Nemours and Company, Wilmington, Del.

[21] Appl. No.: 475,077

[22] Filed: Mar. 14, 1983

[51] Int. Cl.³ .............................................. C08K 9/00
[52] U.S. Cl. ...................... 523/205; 524/322; 524/487; 524/579; 252/511
[58] Field of Search ............. 523/303, 205; 524/322, 524/579, 487

[56] References Cited

U.S. PATENT DOCUMENTS

| | | | |
|---|---|---|---|
| 2,846,421 | 8/1958 | Pollock | 260/82.3 |
| 3,048,551 | 8/1962 | Lutz | 260/28.5 |
| 3,160,598 | 12/1964 | Delfosse | 524/300 |
| 3,230,191 | 1/1966 | Roedel | 260/28.5 |
| 3,280,062 | 10/1966 | Richardson | 260/28.5 |
| 3,303,150 | 2/1967 | Coenen et al. | 260/28.5 |
| 3,606,336 | 5/1972 | Gonta et al. | 260/28.5 |
| 3,665,068 | 5/1972 | Duling et al. | 264/211 |
| 3,964,915 | 6/1976 | Doenges et al. | 524/322 |
| 4,003,426 | 1/1977 | Best et al. | 165/53 |
| 4,126,647 | 11/1978 | Howard, Jr. | 428/265 |
| 4,130,618 | 12/1978 | Hill | 524/487 |
| 4,148,780 | 4/1979 | Blümel et al. | 524/322 |
| 4,151,126 | 4/1979 | Adelman et al. | 524/786 |
| 4,152,899 | 5/1979 | Herrick | 62/4 |
| 4,154,292 | 5/1979 | Herrick | 165/1 |
| 4,182,398 | 1/1980 | Salyer et al. | 165/1 |
| 4,187,210 | 2/1980 | Howard, Jr. | 524/730 |
| 4,191,670 | 3/1980 | Strauch et al. | 524/322 |
| 4,219,453 | 8/1980 | Sakurai et al. | 524/300 |
| 4,221,259 | 9/1980 | Ronc et al. | 165/1 |
| 4,283,316 | 8/1981 | Bonsignore | 524/322 |

FOREIGN PATENT DOCUMENTS

| | | | |
|---|---|---|---|
| 647527 | 8/1962 | Canada | 524/487 |
| 51-067347 | 6/1976 | Japan . | |
| 57-180679 | 11/1982 | Japan . | |
| 2086032 | 10/1981 | United Kingdom . | |

*Primary Examiner*—Joseph L. Schoper
*Assistant Examiner*—N. Sarofim

[57] ABSTRACT

Heat storage composite consisting essentially of about 2-55% of an organic latent heat material and about 45-98% of a filled ethylene polymer.

15 Claims, No Drawings

ETHYLENE POLYMER COMPOSITE HEAT STORAGE MATERIAL

CROSS-REFERENCE TO RELATED APPLICATION

Related subject matter has been disclosed and claimed in copending application Ser. No. 475,076 filed Mar. 14, 1983.

BACKGROUND OF THE INVENTION

1. Field of the Invention

This invention relates to composites which are useful as heat storage, materials and which are comprised of a filled ethylene polymer and an organic latent heat storage material.

2. Background

As fossil fuels become scarce and more expensive, the use of alternate energy sources, such as solar energy and waste energy from industrial processes, becomes more attractive. Since the time periods during which such sources of energy are available do not necessarily correspond to the time periods of energy need, energy storage plays an important role in the use of alternate energy sources.

Various types of heat storage are known. For example, heat can be stored in the form of the sensible heat of a fluid such as water or the sensible heat of a solid such as stone or in the form of a combination of sensible heat and latent heat of a transition, particularly the latent heat of fusion, using materials such as inorganic salt hydrates, paraffin or organic polymers. The transition temperature of the latent heat material used must be below the temperature of the material from which heat is to be removed and stored, and equal to or above the temperature which is to be provided on removal of heat from the latent heat material.

Latent heat materials undergoing liquid/solid phase transitions must be suitably contained. One way to accomplish this is to place the latent heat storage material in a container of suitable size, making allowance for temperature expansion of the latent heat material. This approach using a container may give rise to a heat transfer problem when the heat is removed from the latent heat storage material. Solidification of the latent heat storage material occurs first on the walls of the container, and any additional heat removed must be conducted through the solid thus formed, the solid increasing in thickness as more of the liquid solidifies. Conversely, when heat is being stored in a solid latent heat material, heat transfer is inefficient because convection, which is requisite to efficient heat transfer, is hindered by the high viscosity of the liquid first formed from melted solid. Moreover, on cycling, the solid latent heat storage material may contract and pull away from the walls of the container, thereby further decreasing the efficiency of heat conduction.

The art discloses attempts which have been made to solve some of these problems. For example, a granular form of latent heat material may be used, with the heat transfer medium being passed through a bed of such granules either to supply heat or to extract heat from the granules.

U.S. Pat. No. 2,846,421 discloses a method for controlling the temperature of liquid phase reactions, for example, emulsion polymerization, by means of an encapsulated latent heat material, the capsule being formed from a metal or plastic, the latent heat material being commonly available materials, including water, benzene, glycol, mercury, Glauber's salt and Wood's metal. U.S. Pat. No. 4,182,398 discloses a method for removing heat from a fluid by means of crystalline polyethylene silane-grafted-crosslinked polymer pieces crosslinked to retain at least 70% of the heat of fusion of the uncrosslinked crystalline polymer and sufficiently crosslinked for the pieces not to stick together upon being cycled above and below the melting point of the polymer. U.S. Pat. No. 4,221,259 discloses a method for storing heat by means of a fusible substance, that is, a latent heat material, which is absorbed on a finely divided microporous carrier. Paraffin absorbed on active coal or coke in grains or sticks is exemplified. Other latent heat materials which are disclosed are fusible mineral salts, metal hydrides, alloys, metal alloys and polymers. U.S. Pat. No 4,003,426 discloses a heat or thermal energy storage structure comprising a crosslinked polymeric resinous matrix having a plurality of substantially unconnected small closed cavities and a heat sink material encapsulated within the cavities. A similar type of heat storage composition is disclosed in U.K. patent application GB No. 2086032A.

It is an object of this invention to provide a composite material which is suitable for heat storage. Another object is to provide such a material which can be cycled repeatedly between heat sink and heat source conditions without substantial deterioration. Still another object is to provide such a material which can be fabricated readily from commonly available ingredients. Other objects will become apparent hereinafter.

DISCLOSURE OF INVENTION

For further comprehension of the invention and of the objects and advantages thereof, reference may be made to the following description and to the appended claims in which the various novel features of the invention are more particularly set forth.

The invention resides in a composite consisting essentially of, by weight, with the total being 100%:

(a) about 2-55%, preferably 30-40%, more preferably about 35%, of an organic latent heat material having at least one latent heat transition, as a solid-solid transition(s) and/or a solid-liquid transition, in the temperature range 0°-100° C., and which, when liquid, wets the surface of the filled ethylene polymer of (b); and (b) about 45-98%, preferably 60-70%, more preferably about 65%, of filled ethylene polymer consisting of ethylene polymer and finely divided (particulate) solid filler, substantially all of the ethylene polymer being deposited on the surface of the finely divided filler and substantially all of the filler having ethylene polymer deposited on its surface.

In a more preferred embodiment of the invention the filled ethylene polymer consists essentially of, by weight:

(a) about 10-70%, preferably about 20-55%, of an ethylene polymer having an $\eta_{inh}$ of at least about 1, preferably at least about 2, more preferably at least about 4, most preferably at least about 8, and selected from polyethylene and copolymers of ethylene and up to about 15%, by weight, of one or more polymerizable olefinic hydrocarbons of 3-10 carbon atoms; and (b) about 30-90%, preferably about 45-80%, of a finely divided (particulate) solid filler, substantially all of the ethylene polymer being deposited on the surface of the finely divided filler and substantially all of the filler having ethylene polymer deposited on its surface.

In a still more preferred embodiment of the invention the filler is selected from:

(a) an inorganic compound having a neutral to acidic surface and having interacted at its surface sufficient catalytically active transition metal compound substantially free of halogen bonded to transition metal to provide 0.000001–1.7 milligram-atom of transition metal per gram of filler;

(b) an acrylic polymer selected from polyacrylonitrile and copolymers of acrylonitrile and not more than about 15%, by weight, of one or more polymerizable ethylenically unsaturated comonomers; and (c) conductive carbon.

The term "consisting essentially of" is used to specify the essential components of the composite of the invention; the term is not intended to preclude the inclusion of other components which do not substantially adversely affect the desirable properties of the composite of the invention, such other components thus being nonessential components of the composite.

The organic latent heat compounds which are useful in this invention have a latent heat transition(s), as a solid-solid transition(s) and/or a solid-liquid transition, in the temperature range 0°–100° C. The preferred organic compounds have the highest latent heat capacity per gram when compared to their isomers. Thus, organic compounds having unbranched saturated chains are preferred over organic compounds having branched chains, rings or unsaturated linkages. In addition, since it is necessary that the organic compounds be compatible with the ethylene polymer, they are restricted to those organic compounds that possess a minimum of polar groups and, when molten, will wet the surface of the filled ethylene polymer. In order for the liquid organic compound to wet the surface of the filled ethylene polymer it must have a lower refractive index than that of the ethylene polymer. It is also desirable that the organic compounds have a low vapor pressure in the working temperature range, that is, in the cycling temperature range as a heat sink and as a heat source, be nontoxic, possess little odor, and be thermally stable for a period of years. Latent heat materials having a latent heat of fusion are preferred. Preferred organic latent heat materials are alkanes and alkanoic acids. Especially preferred are paraffin wax and stearic acid.

The filled ethylene polymer comprises well known materials and can be prepared, using known techniques, by polymerizing the monomer(s) in the presence of the filler. Details of the preparation of filled ethylene polymers comprised of ethylene polymer and inorganic compounds can be found in U.S. Pat. Nos. 4,097,447 and 4,187,210; of filled ethylene polymers comprised of ethylene polymer and acrylic polymers, in U.S. Pat. No. 4,126,647; and of filled ethylene polymers comprised of ethylene polymer and conductive carbon, in U.S. Pat. No. 4,151,126.

Following is a description of a known process, from U.S. Pat. No. 4,187,210, for producing a filled ethylene polymer. This process comprises:

(A) dehydrating finely-divided aluminum silicate clay selected from the group consisting of kaolinite, attapulgite, and fuller's earth, and containing at least about 0.05% by weight of titania, said clay having a weight-average equivalent spherical particle diameter of less than about 50 μm, and being free of promotion with added transition metal coordination catalyst component, by heating at a temperature of about 400° to about 1400° C. to reduce the water content to less than one mole of water per mole of aluminum silicate;

(B) dispersing (1) at least about 1 weight/volume percent of finely-divided inorganic filler compound, said filler being
(a) about 70 to about 100% by weight of said dehydrated aluminum silicate clay, and
(b) 0 to about 30% by weight of pigmentary oxide selected from the group consisting of titania, zinc oxide, antimony trioxide and mixtures thereof, said pigmentary oxide having a weight-average equivalent spherical particle diameter less than that of the clay, and (2) about 0.001 to about 1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each, in an inert, liquid hydrocarbon diluent;

(C) contacting the resulting dispersion with olefin selected from the group consisting of ethylene and mixtures of ethylene with one or more 1-alkenes of 3 to 10 carbon atoms with agitation at a temperature of about 0 to about 250° C. and a pressure from about atmospheric to about 500 atmospheres until a composite containing about 10 to about 70% by weight, based on the polyolefin and filler, of polyolefin selected from the group consisting of polyethylene and copolymers of ethylene containing up to about 15% by weight of units derived from one or more 1-alkenes of 3 to 10 carbons having an inherent viscosity of at least about 1 is formed; and (D) isolating the resulting polyolefin/filler composite as a free-flowing powder.

The filled ethylene polymers useful in this invention are such that substantially all of the ethylene polymer is deposited on the surface of the filler and substantially all of the filler has ethylene polymer deposited on its surface. By the term "substantially all" is meant that the amount of filler-free ethylene polymer and the amount of ethylene polymer-free filler are insufficient to materially alter or adversely affect the physical characteristics of the filled ethylene polymers. In other words, "substantially all" excludes both filler-free ethylene polymer and ethylene polymer-free filler in such amounts which prevent the advantages of the invention from being realized.

Although the amount of ethylene polymer in the filled ethylene polymer commonly is 10–70%, preferably 20–55%, the specific amount will depend on the density, nature and particle size of the filler. With larger particle sizes and higher particle densities, less ethylene polymer is needed.

The ethylene polymers which are useful in this invention are polyethylene and copolymers of ethylene containing up to about 15%, by weight, of polymer repeat units of one or more polymerizable olefinic hydrocarbons of 3 to 10 carbon atoms. Suitable comonomers include propylene, 1-butene, 1-pentene, 3-methyl-1-butene, 4-methyl-1-pentene, 1-hexene, 1-octene, 1-decene, norbornene and mixtures thereof. Other comonomers include those which are reactive in known coordination polymerization reactions, for example, linear nonconjugated diolefins, such as 1,4-hexadiene, 1,6-octadiene, dicyclopentadiene and norbornene derivatives, such as ethylidenenorbornene. The preferred ethylene polymer is polyethylene.

The ethylene polymers which are useful in this invention are solids of high molecular weight, that is, they have an inherent viscosity ($\eta_{inh}$) of at least about 1 in order for the composites to exhibit their unusual combination of physical properties. For optimum physical properties of the composite, the ethylene polymer should preferably have an inherent viscosity of at least about 2, more preferably at least about 4, and most preferably at least about 8.

The term "inherent viscosity", as used herein, refers to inherent viscosities determined by the standard procedure outlined below. A sample of the composite powder calculated to contain 0.025 g of polyolefin is placed in a closed flask containing a magnetic stirring bar and adapted for insertion of a thermometer and a condenser containing a nitrogen purge tube. Into this flask is pipetted 50 mL of 1,2,4-trichlorobenzene containing 1.33 g/L of butylated hydroxytoluene antioxidant to give a 0.05 weight/volume percent solution of polyolefin.

With the thermometer and condenser in place, nitrogen is slowly passed over the contents of the flask, the magnetic stirrer is started, and the contents of the flask are heated to 180° C. The solution is stirred at this temperature for 2 hours. At the completion of this time, the condenser unit and the thermometer are removed from the flask. A ground glass stopper is inserted into the thermometer-well, a tube to support a capillary viscometer is inserted in the condenser-well, and the entire unit is transferred to an oil bath and maintained at 130° C. A capillary viscometer having three scratch marks, one near the bottom, one above the bulb and one below the bulb is inserted into the support tube.

After 1 hour at 130° C. in the oil bath, the viscometer is adjusted so that the tip is immersed in the solution to the depth indicated by the bottom scratch. Vacuum is gently applied to the top of the viscometer until the solution has risen to a level above the top scratch on the viscometer. The vacuum is removed and the solution is allowed to fall. The flow of the solution between the scratch above the bulb and the scratch below the bulb is timed. This flow time measurement is repeated until three values which check within +0.3 second are obtained. The flow time of the pure solvent is also measured at 130° C. in the same way.

The inherent viscosity is calculated using the following equations:

$$\text{Relative Viscosity} = \frac{\text{Time of solution flow}}{\text{Time of solvent flow}}$$

$$\text{Inherent Viscosity} = \frac{\text{natural log of relative viscosity}}{\text{w/v\% polymer concentration}}$$

The finely divided solid filler likewise comprises known materials and is discussed in detail in the aforesaid patents disclosing the preparative aspects of the filled ethylene polymer. Preferably, the inorganic compound filler should have a neutral to acidic surface and should have interacted at its surface a catalytically active transition metal compound which is substantially free of halogen bonded to the transition metal to provide about 0.000001 to about 1.7 milligram-atom of transition metal per gram of filler. The inorganic compound, the preferred filler, can be coated with an acidic oxide to provide an acidic surface. Preferred inorganic compounds include the alumina hydrates, silicas, water-insoluble silicates, calcium carbonate and basic aluminum-sodium carbonates. The preferred transition metal is selected from the group consisting of titanium, zirconium and chromium.

The acrylic polymer which is useful as the filler in this invention is selected from polyacrylonitrile and copolymers of acrylonitrile and not more than about 15%, by weight, of polymeric repeat units of one or more polymerizable ethylenically unsaturated comonomers.

Suitable crystalline and partially crystalline forms of conductive carbon which are useful as the filler include graphite and carbon black, respectively. Graphite can be obtained in its naturally occurring form or it can be obtained by heating coal in an electric furnace. Conductive carbon blacks also can be obtained by the incomplete combustion of hydrocarbon vapors; those prepared by such a process include the acetylene blacks, the channel blacks and, most importantly, the furnace blacks.

Generally, the composite of this invention, in particulate form, is prepared by adding to a hydrocarbon solution of the latent heat storage material the appropriate amount of filled ethylene polymer, that is, 2–55% of latent heat material and 45–98% of filled ethylene polymer. The solvent is then removed, for example, evaporated, and the resulting powder is recovered. The solvent should be one in which the organic latent heat material is soluble, and it should be readily removable, for example, by evaporation. Suitable solvents include hydrocarbons, such as pentane and hexane, and the chlorinated hydrocarbons, such as methylene chloride, chloroform and carbon tetrachloride.

The composite of this invention, in particulate form, can also be prepared by direct imbibition of the organic latent heat material into the filled ethylene polymer. In this method the polymer is added to a container containing molten organic latent heat material. The temperature is below that at which the filled polymer becomes tacky.

The composite of this invention, in particulate form, can also be prepared by adding the organic latent heat material directly to the reaction mixture used in the preparation of the filled ethylene polymer. The organic material can itself serve as the solvent for the polymerization reaction, or it can be a component of the polymerization solvent. The polymerization must be carried out at a temperature above the melting point of the organic material but below the temperature at which the filled polymer product becomes tacky.

The composite composition of this invention, in particulate form, is free-flowing. Typically, the average particle size is in the range of about 0.003–5 mm; aggregates of such particles may be present. The organic latent heat material is contained within each filled ethylene polymer particle and is substantially retained by the particle even when heated above the melting point of the organic latent heat material.

The composite of this invention, as a free-flowing powder, can be formed into various shaped heat storage elements, for example, bricks, pipes and blocks with channels for fluid flow; these shaped elements have good mechanical properties. It has been confirmed experimentally that the latent heat capacity of the heat storage element is directly proportional to the amount of latent heat material present; the filled ethylene polymer does not affect the latent heat capacity. Therefore, it is desirable for the heat storage element to contain as much latent heat material as possible, subject to the condition that the latent heat material is substantially contained and retained within the formed heat storage element even when heated above the melting temperature of the latent heat material. In order to best achieve this feature, the preferred heat storage elements of the invention contain 30–40% of organic latent heat material. Especially preferred are heat storage elements containing about 35% of organic latent heat material. A preferred heat storage element is free from any substantial effluence of latent heat material, that is, effluence is less than about 15% of the total amount of latent heat material contained in the composite upon temperature cycling of the article through a temperature range which includes the latent heat of fusion transition, that is, the melting temperature, of the latent heat material.

The heat storage element can be made by compressing the composite powder of the invention in a mold at a pressure of from about 500 psi to about 60,000 psi (about 3450 kPa to about 414,000 kPa), and at a temperature above −40° C. but below that of any solid-liquid transition of the latent heat material.

The heat storage element can also be prepared by first pressing the filled ethylene polymer into the desired shape of the heat storage element at a pressure of from about 500 psi to about 60,000 psi (about 3450 kPa to about 414,000 kPa) and a temperature below the softening point of the polymer. The composite heat storage element is then prepared by imbibition of the organic latent heat material by the shaped filled ethylene polymer. The shaped article is placed in molten organic latent heat material in a vacuum flask and the flask evacuated to remove most of the air. The vacuum is then broken and the atmospheric pressure forces the molten organic latent heat material into the shaped article.

The heat storage elements of this invention can be prepared in various shapes which are especially useful in a thermal energy storage apparatus and these shaped elements have surprisingly high mechanical strength. For example, they can be prepared in the form of pipes so that the heat exchange fluid can be passed directly through them. Alternatively, they can be prepared with flow channels for passing a fluid of temperature above that of the latent heat transition and with flow channels for passing a fluid of temperature below that of the latent heat transition, said fluids making good thermal contact, either directly or by means of a metallic conductor, with the heat storage material. Other useful forms will be obvious to those skilled in the art.

The following examples are intended to illustrate but not limit the invention. Unless otherwise noted, all parts and percentages are by weight and all temperatures are in degrees Celsius.

EXAMPLE 1

A. Alumina-filled polyethylene (70% $Al_2O_3$ $3H_2O$/30% ultrahigh-molecular weight polyethylene) powder was prepared using substantially the procedural details described in Example 2 of U.S. Pat. No. 4,187,210. To a solution of 42.86 g of paraffin wax, m.p. 52°–54°, in 300 mL of pentane was added 100 g of the alumina-filled polyethylene powder. The slurry was concentrated on a rotary evaporator using a steam bath as a heat source and an aspirator for a vacuum. The powder was further dried using a vacuum pump operating at 1.33 Pa for 12 hours to give 142 g of a freely-flowing powder product. The composite particulate product was comprised of approximately 30% paraffin wax and approximately 70% filled polyethylene.

B. 15.8811 grams of the product of Part A was pressed in a Carver press at 6000 psi (41,400 kPa) for 3 minutes at room temperature to yield a pellet having a density of 1.2815 at 23°. This demonstrates that the particulate composite of this invention can be formed into shapes which may be useful as heat storage elements.

EXAMPLE 2

A. A filled ethylene polymer containing 43% Optiwhite ® calcined clay and 57% polyethylene was prepared using substantially the procedural details of Example 46 of U.S. Pat. No. 4,187,210. To a solution of 1602 g of paraffin wax in 5 L of hexane was added 2975 g of the clay-filled polyethylene. The slurry was concentrated on a rotary evaporator using a steam bath as a heat source and dried for 14 hours in a vacuum to give 4577 g of a freely-flowing product powder comprised of 35% paraffin wax and 65% filled polyethylene.

B. 3865 Grams of the particulate composite of Part A was pressed at 6,000 psi (41,400 kPa) at 20° in a 10 inch × 10 inch (25.4 cm × 25.4 cm) press and resulted in a pressed slab 10 inches × 10 inches × 2 inches (25.4 cm × 25.4 cm × 5.08 cm). The slab was painted black on one surface and mounted into a Tedlar ® polyvinyl fluoride film-covered box, insulated on the rear side, and provided with thermocouples for measuring and recording time vs. temperature of the slab. A slab of concrete of similar dimensions painted black on one side was used as a control. Sunlight was used to irradiate the painted black surfaces. After irradiation by sunlight for 5 hours the slabs were shielded from sunlight by a cover. The concrete control slab returned from a peak of 72° to ambient temperature in 45 minutes. The composite slab reached a peak of 60° and during cooling remained at 52° for 9 hours, then gradually returned to ambient temperature over the next 7 hours.

The composite slab was subjected to solar radiation for over one year without visibly-noticeable deterioration. These results demonstrate that the latent storage material may be used in a Trombe wall configuration to receive and store solar energy.

EXAMPLE 3

This example demonstrates the making of the composite of the invention by adding the organic latent heat material directly to the reaction mixture in which the filled polyethylene is prepared.

Molten paraffin wax (500 mL), m.p. 52°, was passed through a bed of Woelm acidic alumina while purging the apparatus with nitrogen gas. Tetrabenzylzirconium (0.4 mmol) and triisobutylaluminum (7.0 mmol) were added to the wax. Alcoa C333 alumina (50 g), $Al_2O_3$ $3H_2O$, was dried for 18 hours under a nitrogen purge at 170°, then added to the molten paraffin wax and reacted for 4.5 hours with ethylene gas at 65° and 200 psi (1400 kPa) to form polyethylene. The alumina took up 33 g of ethylene. The contents of the reactor were removed, 200 mg of Irganox ® 1010 (pentaerythritol ester of 3,5-di-tert-butyl-4-hydroxyphenylacetic acid manufactured by Ciba Geigy) antioxidant was added, and the mixture was filtered while hot to give 105 g of a mineral-supported polyethylene paraffin composite containing 50.8% paraffin wax, 21.2% $Al_2O_3$ $3H_2O$ and 28% polyethylene.

EXAMPLES 4-21

Imbibition of the organic latent heat material by a shaped piece of filled ethylene polymer is demonstrated in these examples.

Three batches of filled-polyethylene powders, each containing different fillers, were prepared as follows:

I—70% $Al_2O_3$ $3H_2O$/30% polyethylene substantially by the method of Example 1.

II—50% $Al_2O_3$ $3H_2O$/25% calcined clay/25% polyethylene substantially by the method of Example 2.

III—55% $CaCO_3$/45% polyethylene using substantially the procedural details of Example 50 of U.S. Pat. No. 4,187,210.

A given amount of filled polyethylene was placed in a mold in a Carver press and pressed at a pressure in the range 1000 psi to 6000 psi (6900 kPa to 41,400 kPa) at room temperature for 3 minutes to form a disk 1 square inch (6.4 square cm) in area and about 1/8 inch (3.2 mm) thick. The disk was placed in a vacuum flask along with 20 g of either paraffin wax, m.p. 52°-54°, or stearic acid, m.p. 67°-69°. The flask was heated on a steam bath, to melt the organic material, and evacuated at 1.33 Pa for 40 minutes. The vacuum was then broken and the disk was allowed to remain in the molten organic material for 10 minutes. The disk was removed, cooled to 25°, and excess organic material was removed from the surface of the disk. The data are summarized in the following table; the last column shows the % latent heat material contained in the disc.

TABLE

| Example No. | Filled Polyethylene | Mold Pressure (kPa) | Organic Latent Heat Material | % Latent Heat Material |
|---|---|---|---|---|
| 4 | I | 6,900 | Paraffin | 28.8 |
| 5 | I | 20,700 | " | 18.0 |
| 6 | I | 41,400 | " | 10.8 |
| 7 | II | 6,900 | " | 35.4 |
| 8 | II | 20,700 | " | 19.2 |
| 9 | II | 41,400 | " | 10.7 |
| 10 | III | 6,900 | " | 31.3 |
| 11 | III | 20,700 | " | 18.3 |
| 12 | III | 41,400 | " | 10.0 |
| 13 | I | 6,900 | Stearic Acid | 28.2 |
| 14 | I | 20,700 | " | 14.4 |
| 15 | I | 41,400 | " | 7.7 |
| 16 | II | 6,900 | " | 32.8 |
| 17 | II | 20,700 | " | 19.3 |
| 18 | II | 41,400 | " | 4.8 |
| 19 | III | 6,900 | " | 32.4 |
| 20 | III | 20,700 | " | 16.7 |
| 21 | III | 41,400 | " | 5.8 |

EXAMPLE 22

A series of latent heat storage materials was prepared by combining 100-50 parts of a composite of 65% $CaCO_3$ and 35% polyethylene, made using substantially the procedural details of Example 50 of U.S. Pat. No. 4,187,210, with 0-50 parts of paraffin wax, following the procedure of Example 1A. Pellets 1 cm in diameter and 1 cm in length were prepared by pressing the resultant material at 41,400 kPa as in Example 1B. The pellets were placed in a heatable press and subjected to a pressure of 20 psi (140 kPa). The temperature was varied as follows: 4 hours to heat from 20° to 95°, 8 hours at 95°, 4 hours to cool from 95° to 20°, and 8 hours at 20°. After a total time of thermal cycling of 1000 hours, there was little loss of paraffin wax at loadings up to 30% (0.4% loss at 20% loading and 1.6% loss at 30% loading). The pellet with 40% paraffin wax showed a loss of paraffin wax of about 11%. The pellets containing 20, 30, and 40% paraffin wax showed a creep crush of 1.20, 5.35 and 16.76 as measured according to ASTM D2990-77. The pellet containing 50% paraffin wax was quite soft; nevertheless, a substantial amount of the paraffin wax was retained within the pellet.

These results demonstrate that the organic latent heat material is substantially contained and retained within the formed element and that the latent heat storage material possesses sufficient strength to be self supporting or to support a load of 140 kPa despite extensive temperature cycling above and below the melting point of the latent heat material.

The following experiments were carried out to show that certain prior art composites do not exhibit the desirable features of the composites of the invention. Percentages are by weight and temperatures are in degrees Celsius.

EXPERIMENT 1

Two disks, one of polyethylene and one of polyacrylonitrile, were formed by pressing 325 mesh (U.S. Sieve Series) polyethylene powder and polyacrylonitrile powder, respectively, at 6000 psi (41,400 kPa) at room temperature for 2 minutes. Each disk was made to imbibe 35% by weight of paraffin wax in a manner analgous to that described in Examples 4-21. The polyethylene/paraffin wax disk became very soft above 50°. The polyacrylonitrile/paraffin wax composite was very brittle and cracked easily at room temperature and crumbled at 50° C. These results show the necessity for using the highly-filled ethylene polymers to obtain the mechanical properties of the shaped composites of this invention.

EXPERIMENT 2

The following materials were used:

(a) lignite—"Alcoa" Texas Lignite, sieved 100-mesh (U.S. Sieve Series), black powder (b) hard coal—"R&F" Pittsburgh 8 coal, 200-mesh (U.S. Sieve Series), fine black powder (c) coke breeze—Phoenix Steel Corp., sieved 10-mesh (U.S. Sieve Series)

(d) charcoal—Darco G-60, Fisher Chemical Co.

Each of these materials, in turn, was impregnated with 30% paraffin wax, using the method of Example 1, and then pressed into a pellet. The pellets were heated for one hour at 90° and then subjected to a load of 20 psi (140 kPa). The pellets prepared from either lignite or hard coal were crushed and collapsed under this load. The pellets prepared from charcoal contained many cracks. The pellets containing coke crumbled at a paraffin wax content of 3% and could not be made to contain 30% paraffin wax.

A control pellet comprised of 65% alumina/polyethylene and 35% paraffin wax, as made in Example 1, showed no changes under such loading; such a pellet can withstand pressures well in excess of 20 psi (140 kPa).

BEST MODE FOR CARRYING OUT THE INVENTION

The best mode presently contemplated for carrying out the invention is represented by those embodiments wherein the filled ethylene polymer consists of polyethylene filled with alumina and the organic latent heat material is paraffin wax.

INDUSTRIAL APPLICABILITY

The industrial applicability of heat sink/heat source composites is well known and is adequately discussed in the background section of this specification. The composites of this invention provide an improvement over the art.

We claim:

1. Composite consisting essentially of, by weight, with the total being 100%:
   (a) about 30-55% of an organic latent heat material having at least one latent heat transition, as a solid-solid transition(s) and/or a solid-liquid transition, in the temperature range 0-100° C., and which, when liquid, wets the surface of the filled ethylene polymer of (b); and
   (b) about 45-70% of filled ethylene polymer consisting of ethylene polymer and finely divided (particulate) solid filler, substantially all of the ethylene polymer being deposited on the surface of the finely divided filler and substantially all of the filler having ethylene polymer deposited on its surface.

2. Composite of claim 1 wherein the filler is an inorganic compound.

3. Composite of claim 2 wherein the ethylene polymer is polyethylene and the latent heat material is an alkane or an alkanoic acid.

4. Composite of claim 3 wherein the latent heat material is paraffin wax.

5. Composite of claim 1 wherein the filled ethylene polymer consists essentially of, by weight:
   (a) about 10-70% of an ethylene polymer having an $\eta_{inh}$ of at least about 1 and selected from polyethylene and copolymers of ethylene and up to about 15%, by weight, of one or more polymerizable olefinic hydrocarbons of 3-10 carbon atoms; and
   (b) about 30-90% of finely divided (particulate) solid filler, substantially all of the ethylene polymer being deposited on the surface of the finely divided filler and substantially all of the filler having ethylene polymer deposited on its surface.

6. Composite of claim 5 wherein the filler is selected from
   (a) an inorganic compound having a neutral to acidic surface and having interacted at its surface sufficient catalytically active transition metal compound substantially free of halogen bonded to transition metal to provide 0.000001-1.7 milligram-atom of transition metal per gram of filler;
   (b) an acrylic polymer selected from polyacrylonitrile and copolymers of acrylonitrile and not more than about 15%, by weight, of one or more polymerizable ethylenically unsaturated comonomers; and
   (c) conductive carbon.

7. Composite of claim 5 consisting essentially of 30-40% of organic latent heat material and 60-70% of filled ethylene polymer.

8. Composite of claim 5 wherein the filled ethylene polymer consists essentially of about 20-55% of ethylene polymer having an $\eta_{inh}$ of at least about 2 and about 45-80% of filler.

9. Composite of claim 8 wherein the ethylene polymer has an $\eta_{inh}$ of at least about 8.

10. Composite of claim 5 wherein the ethylene polymer is polyethylene and the latent heat material is an alkane or an alkanoic acid.

11. Composite of claim 10 wherein the latent heat material is paraffin wax.

12. Composite of claim 10 wherein the latent heat material is stearic acid.

13. Composite of claim 6 wherein the filler is an inorganic compound.

14. Pressure-molded shaped article of the composite of claim 1.

15. Heat storage element of the composite of claim 1.

* * * * *